US010154033B2

(12) United States Patent
Tseng

(10) Patent No.: US 10,154,033 B2
(45) Date of Patent: Dec. 11, 2018

(54) ELECTRONIC DEVICE AND METHOD FOR ESTABLISHING WIRELESS CONNECTION

(71) Applicant: AMBIT MICROSYSTEMS (SHANGHAI) LTD., Shanghai (CN)

(72) Inventor: Chi-Teng Tseng, Taoyuan (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 198 days.

(21) Appl. No.: 15/252,234

(22) Filed: Aug. 31, 2016

(65) Prior Publication Data

US 2017/0367130 A1    Dec. 21, 2017

(30) Foreign Application Priority Data

Jun. 16, 2016   (TW) .................................. 105119016

(51) Int. Cl.
*H04L 29/06* (2006.01)
*H04W 12/06* (2009.01)
*H04W 76/11* (2018.01)
*H04W 84/12* (2009.01)

(52) U.S. Cl.
CPC ........ *H04L 63/0876* (2013.01); *H04L 63/101* (2013.01); *H04L 63/107* (2013.01); *H04L 63/18* (2013.01); *H04W 12/06* (2013.01); *H04W 76/11* (2018.02); *H04W 84/12* (2013.01)

(58) Field of Classification Search
CPC ..... H04L 63/08; H04L 63/0876; H04L 63/10; H04L 63/101; H04L 63/107; H04L 63/18; H04W 79/11; H04W 12/06; H04W 84/12
See application file for complete search history.

(56) References Cited

U.S. PATENT DOCUMENTS

| | | | | |
|---|---|---|---|---|
| 2002/0162021 | A1* | 10/2002 | Audebert ........... | G06Q 20/3672 726/4 |
| 2005/0094838 | A1* | 5/2005 | Tomoda .............. | H04M 1/6066 381/370 |
| 2006/0121902 | A1* | 6/2006 | Jagadeesan .......... | H04W 36/14 455/439 |
| 2008/0084985 | A1* | 4/2008 | Diethorn ................. | H04M 3/16 379/202.01 |
| 2008/0137650 | A1* | 6/2008 | Kumarasamy .......... | H04L 12/66 370/356 |
| 2009/0070796 | A1* | 3/2009 | Stomakhin ............. | H04N 7/165 725/1 |

(Continued)

FOREIGN PATENT DOCUMENTS

CN            104581986 A   *   4/2015

*Primary Examiner* — Eric W Shepperd
(74) *Attorney, Agent, or Firm* — ScienBiziP, P.C.

(57) ABSTRACT

A connection method for a mobile device to access the Internet through wireless Local Area Network (WLAN) established by a wireless access point (WAP) includes receiving a connection request from a mobile device. Login information and interface is sent to the mobile device by WAP, the mobile device can generate and broadcast dual tone multi frequency information including its own MAC address through loudspeaker. A distance between the mobile device and the WAP being close, the information of mobile device through DTMF is heard and received and MAC address is extracted. If the extracted MAC address matches the MAC address recorded in an access control list of the WAP, the mobile device is permitted to access the internet through the established WLAN.

15 Claims, 3 Drawing Sheets

(56) References Cited

U.S. PATENT DOCUMENTS

| | | | |
|---|---|---|---|
| 2011/0029359 A1 | 2/2011 | Roeding | |
| 2011/0123008 A1* | 5/2011 | Sarnowski | H04L 63/0853 379/93.02 |
| 2012/0156997 A1* | 6/2012 | Kim | H04W 8/005 455/41.2 |
| 2013/0290494 A1* | 10/2013 | Goudarzi | H04L 65/1046 709/219 |
| 2014/0274200 A1* | 9/2014 | Olson | H04B 1/3877 455/552.1 |
| 2015/0105046 A1* | 4/2015 | Grosby | H04W 12/06 455/411 |
| 2016/0037389 A1* | 2/2016 | Tagg | H04L 12/2856 370/331 |
| 2016/0156719 A1 | 6/2016 | Mobarak et al. | |

* cited by examiner

ELECTRONIC DEVICE AND METHOD FOR ESTABLISHING WIRELESS CONNECTION

CROSS-REFERENCE TO RELATED APPLICATIONS

This application claims priority to Taiwanese Patent Application No. 105119016 filed on Jun. 16, 2016, the contents of which are incorporated by reference herein.

FIELD

The subject matter herein generally relates to communication technologies, and particularly to a method for establishing wireless connection an electronic device using the method.

BACKGROUND

An electronic device, for example, a router, is configured to establish a wireless local area network (WLAN). A mobile device can access the WLAN by a password which is set for the electronic device. The mobile device can access the WLAN without a password, but cannot access the Internet through the WLAN.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
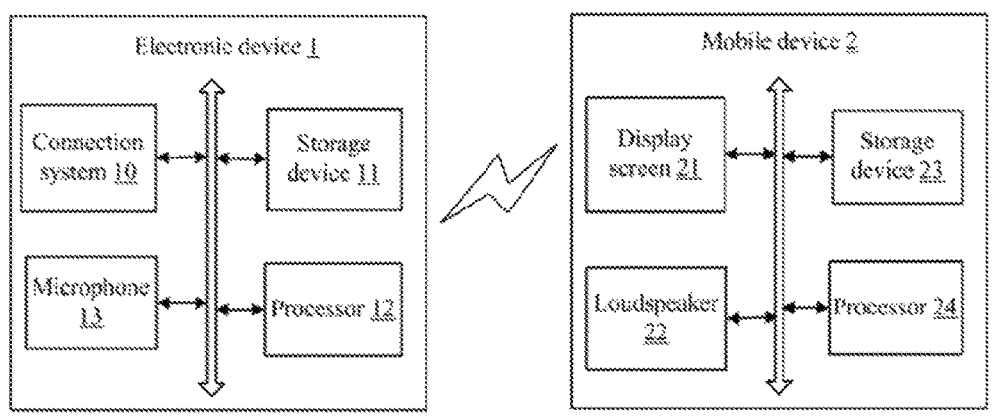
FIG. 1 illustrates a schematic diagram of one embodiment of an electronic device communicating with a mobile device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 illustrates a schematic diagram of one embodiment of an electronic device communicating with a mobile device. Depending on the embodiment, the electronic device 1 can include, but is not limited to, a storage device 11, and at least one processor 12. The above components communicate with each other through a system bus. In at least one embodiment, the electronic device 1 can be a router, a gateway, a wireless access point device, or any other suitable device configured with a function of establishing wireless local area network. FIG. 1 illustrates only one example of the electronic device 1 that can include more or fewer components than illustrated, or have a different configuration of the various components in other embodiments.

In at least one embodiment, the electronic device 1 can set up a wireless local area network, and can access the Internet through the wireless local area network (WLAN). The electronic device 1 further can communicate with a number of mobile devices 2 through the wireless local area network, and the number of mobile devices 2 can communicate with each other through the WLAN. For example, when the electronic device 1 is a wireless access point, the wireless access point can set up a WLAN. A mobile device 2 can access to the WLAN by inputting an authorized password.

In at least one embodiment, the storage device 11 can be a memory of the electronic device 1. In other embodiments, the storage device 11 can be a secure digital card, or other external storage device such as a smart media card. In at least one embodiment, the storage device 11 can store an access control list, and the access control list can be based on media access control (MAC) address. The access control list includes MAC address of the mobile device 2 which is able to access the WLAN. The access control list can set access or non-access states in relation to the MAC address. The access state includes allowing the mobile device 2 to access the Internet through the WLAN, a state of non-access does not allow the mobile device 2 to access the Internet through the WLAN.

In at least one embodiment, a user can configure the electronic device 1 to allow or not allow the mobile device 2 to access the Internet through the WLAN, and can modify the authority of the mobile device 2 in relation to Internet access.

In at least one embodiment, the electronic device 1 can electronically connect to a microphone 13 through an interface of the electronic device 1. The microphone 13 can collect sound. For example, when the electronic device 1 is an access point device, the microphone 13 can connect to the electronic device 1 through a universal serial bus (USB) interface.

In at least one embodiment, the storage device 11 further can store a connection system 10 which is a collection of instructions. The connection system 10 can be executed by the processor 12 to establish connection between the mobile device 2 and the Internet by broadcasting dual tone multi frequency (DTMF) information which includes a MAC address of the mobile device 2.

The at least one processor 13 can be a central processing unit (CPU), a microprocessor, or other data processor chip that performs functions of the electronic device 1.

In at least one embodiment, the mobile device 2 includes, but is not limited to, a display screen 21, a loudspeaker 22, a storage device 23, and at least one processor 24. In at least one embodiment, the display screen 21 can be a liquid crystal display (LCD) or an organic light-emitting diode (OLED) display screen. The loudspeaker 22 can broadcast sound. The storage device 23 can be a memory of the mobile device 2. In other embodiments, the storage device 23 can be a secure digital card, or other external storage device such as a smart media card. The at least one processor 24 can be a central processing unit (CPU), a microprocessor, or other data processor chip that performs functions of the mobile device 2.

Figure 2:
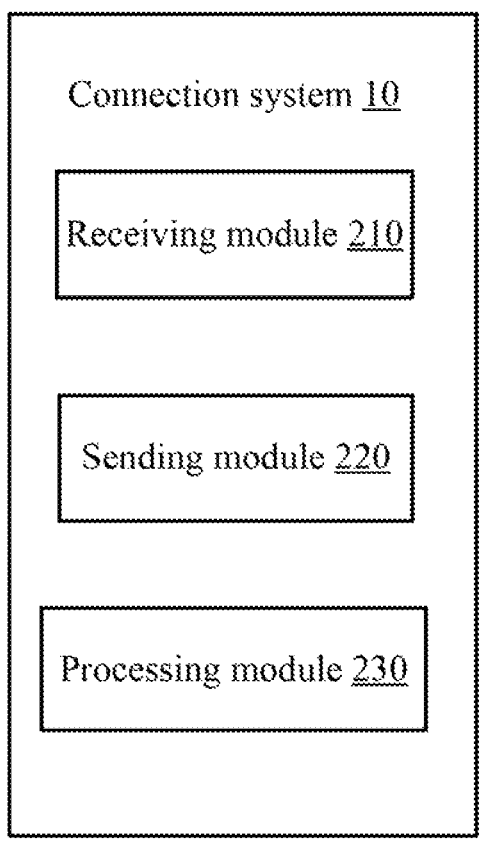
FIG. 2 is a block diagram of one embodiment of modules of a connection system of the electronic device of FIG. 1.

FIG. 2 is a block diagram of one embodiment of modules of a connection system of the electronic device 1. In at least one embodiment, the connection system 10 can include a receiving module 210, a sending module 220, and a processing module 230. The modules 210-230 include computerized codes in the form of one or more programs that may be stored in the storage device 11. The computerized codes include instructions that are executed by the at least one processor 12.

In at least one embodiment, the receiving module 210 can receive a request from a mobile device 2 to access a WLAN established by the electronic device 1. When the mobile device 2 enters an effective coverage range of the WLAN, the mobile device 2 can scan service set identifier (SSID) of the WLAN, and can access the WLAN according to the SSID. In at least one embodiment, mobile device 2 can access the WLAN without requiring any password. However, the WLAN is initially set as a no service state. Thus, the mobile device 2 cannot access the Internet through the WLAN.

In at least one embodiment, the sending module 220 can send login information to the mobile device 2 for informing the mobile device 2 to receive the login information and generate DTMF signal. The sending module 220 can send a web page with the login information to the mobile device 2. When the mobile device 2 receives the web page with the login information, the web page can be displayed on the display screen 21 of the mobile device 2. A login interface is displayed on the web page for the mobile device 2 to access the WLAN.

In at least one embodiment, when the mobile device 2 enters the login interface, the mobile device 2 can search for the IP address assigned to it from an information list of the WLAN. The mobile device 2 can find MAC address according to the IP address, and can convert the MAC address to dual tone multi frequency (DTMF) signal by using a DTMF generator (not shown). In at least one embodiment, the DTMF signal includes eight frequencies. The eight frequencies can be grouped into a group of low frequencies and a group of high frequencies. The group of low frequencies includes four frequencies, for example, 697 Hz, 770 Hz, 852 Hz, and 941 Hz. The group of high frequencies includes four frequencies, for example, 1209 Hz, 1336 Hz, 1447 Hz, and 1633 Hz. A MAC address can be included in DTMF signal. In communication system, the DTMF generator can transmit dialing signal of a phone, and caller identification (CID) signal.

In at least one embodiment, when a distance between the mobile device 2 and the electronic device 1 is less than a predetermined distance, the mobile device 2 can broadcast the DTMF signal which includes the MAC address as sound to the electronic device 1 by the loudspeaker 22.

In at least one embodiment, the receiving module 210 can receive the DTMF signal and record the MAC address. The receiving module 210 can record the DTMF signal received by the microphone 13 and can extract the MAC address from the recorded DTMF signal.

In at least one embodiment, the processing module 230 can determine whether the extracted MAC address matches a MAC address of the access control list. The processing module 230 can search for the MAC address in the access control list of the electronic device 1 to determine whether the mobile device 2 can access the Internet. When the extracted MAC address matches the MAC address of the access control list, the processing module 230 can modify the state of the MAC address of the access control list. Thus, the mobile device 2 is allowed to access the Internet through the established wireless local network. When the extracted MAC address does not match the MAC address of the access control list, the processing module 230 is able to not allow the mobile device 2 to access the Internet through the WLAN.

Figure 3:
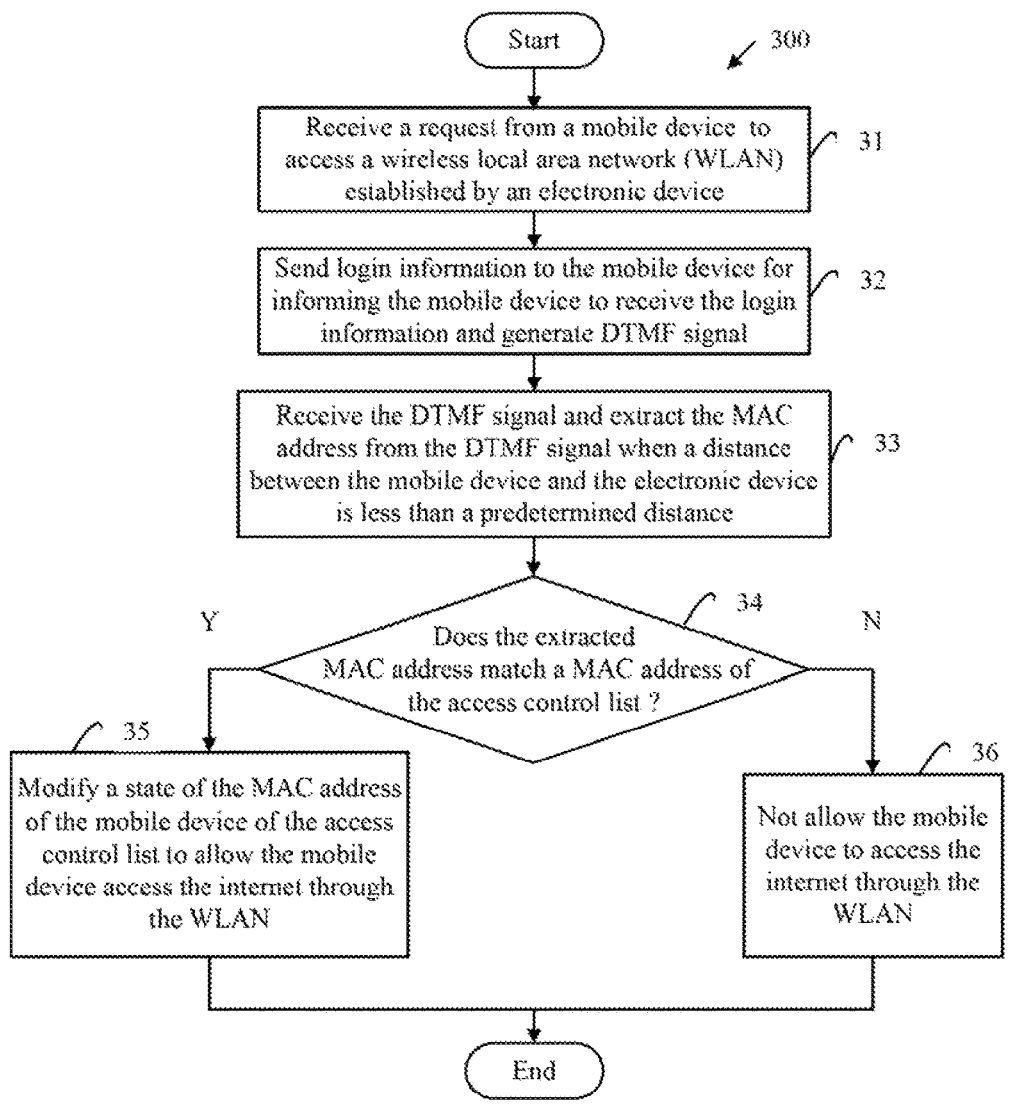
FIG. 3 illustrates a flowchart of one embodiment of a method for establishing connection by the electronic device of FIG. 1.

FIG. 3 illustrates a flowchart which is presented in accordance with an example embodiment. The example method 300 is provided by way of example, as there are a variety of ways to carry out the method. The method 300 described below can be carried out using the configurations illustrated in FIG. 1, for example, and various elements of these figures are referenced in explaining example method 300. Each block shown in FIG. 3 represents one or more processes, methods, or subroutines, carried out in the example method 300. Additionally, the illustrated order of blocks is by example only and the order of the blocks can be changed according to the present disclosure. The example method 300 can begin at block 31. Depending on the embodiment, additional steps can be added, others removed, and the ordering of the steps can be changed.

At block 31, the receiving module 210 can receive a request from a mobile device 2 to access a WLAN established by the electronic device 1. When the mobile device 2 enters an effective coverage range of the WLAN, the mobile device 2 can scan service set identifier (SSID) of the WLAN, and can access the WLAN according to the SSID. In at least one embodiment, mobile device 2 can access the WLAN without requiring any password. However, the WLAN is initially set as a no service state. Thus, the mobile device 2 cannot access the Internet through the WLAN.

At block 32, the sending module 220 can send login information to the mobile device 2 for informing the mobile device 2 to receive the login information and generate DTMF signal. The sending module 220 can send a web page with the login information to the mobile device 2. When the mobile device 2 receives the web page with the login information, the web page can be displayed on the display screen 21 of the mobile device 2. A login interface is displayed on the web page for the mobile device 2 to access the WLAN.

In at least one embodiment, when the mobile device 2 enters the login interface, the mobile device 2 can search for the IP address assigned to it from an information list of the WLAN. The mobile device 2 can find MAC address according to the IP address, and can convert the MAC address to dual tone multi frequency (DTMF) signal by using a DTMF generator (not shown). In at least one embodiment, the DTMF signal includes eight frequencies. The eight frequencies can be grouped into a group of low frequencies and a group of high frequencies. The group of low frequencies includes four frequencies, for example, 697 Hz, 770 Hz, 852 Hz, and 941 Hz. The group of high frequencies includes four frequencies, for example, 1209 Hz, 1336 Hz, 1447 Hz, and 1633 Hz. A MAC address can be included in DTMF signal. In communication system, the DTMF generator can transmit dialing signal of a phone, and caller identification (CID) signal.

In at least one embodiment, when a distance between the mobile device 2 and the electronic device 1 is less than a predetermined distance, the mobile device 2 can broadcast the DTMF signal which includes the MAC address as sound to the electronic device 1 by the loudspeaker 22.

At block 33, when a distance between the mobile device 2 and the electronic device 1 is less than a predetermined value, the receiving module 210 can receive the DTMF signal and record the MAC address. The receiving module 210 can record the DTMF signal received by the microphone 13 and can extract the MAC address from the recorded DTMF signal.

At block 34, the processing module 230 can determine whether the extracted MAC address matches a MAC address of the access control list. The processing module 230 can search for the MAC address in the access control list of the electronic device 1 to determine whether the mobile device 2 can access the Internet. When the extracted MAC address matches the MAC address of the access control list, the process goes to block 35. When the extracted MAC address does not match the MAC address of the access control list, the process goes to block 36.

At block 35, the processing module 230 can modify the state of the MAC address of the mobile device 2 of the access control list. Thus, the mobile device 2 is allowed to access the Internet through the WLAN.

At block 36, the processing module 230 is able to not allow the mobile device 2 to access the Internet through the WLAN.

In other embodiments, a receiving module 210, a sending module 220, and a processing module 230 of the connection system 10 can be hardware or firmware.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A connection method applied in an electronic device, the electronic device comprising a storage device that stores an access control list, the method comprising:
   receiving a request from a mobile device to access a wireless local area network WLAN established by the electronic device;
   sending login information to the mobile device, for informing the mobile device to generate dual-tone multi-frequency DTMF signal comprising a media access control MAC address of the mobile device;
   receiving the DTMF signal when a distance between the mobile device and the electronic device is less than a predetermined distance;
   extracting the MAC address from the DTMF signal; and
   when the extracted MAC address matches a MAC address recorded in the access control list, modifying a state of the MAC address recorded in the access control list to allow the mobile device to access the Internet through the WLAN.

2. The method according to claim 1, wherein the step of receiving the DTMF signal further comprises receiving the DTMF signal by a microphone of the electronic device when the mobile device broadcasts the DTMF signal as sound by a loudspeaker.

3. The method according to claim 1, wherein the step of generating the DTMF signal further comprises:
   searching for an IP address assigned to the mobile device from an information list of the WLAN;
   finding the MAC address according to the IP address; and
   converting the MAC address to the DTMF signal by using a DTMF generator.

4. The method according to claim 1, wherein the mobile device accesses the WLAN according to a service set identifier SSID.

5. The method according to claim 4, wherein no password is set for the WLAN, while the WLAN is initially set as a no service state.

6. An electronic device comprising:
   a storage device that stores an access control list;
   at least one processor; and
   the storage device further stores one or more programs that, when executed by the at least one processor, cause the at least one processor to:
   receive a request from a mobile device to access a wireless local area network WLAN established by the electronic device;
   send login information to the mobile device, for informing the mobile device to generate dual-tone multi-frequency DTMF signal comprising a media access control MAC address of the mobile device;
   receive the DTMF signal when a distance between the mobile device and the electronic device is less than a predetermined distance;
   extract the MAC address from the DTMF signal; and
   when the extracted MAC address matches a MAC address recorded in the access control list, modify a state of the MAC address recorded in the access control list to allow the mobile device to access the Internet through the WLAN.

7. The electronic device according to claim 6, wherein the step of receiving the DTMF signal further comprises receiving the DTMF signal by a microphone of the electronic device when the mobile device broadcasts the DTMF signal as sound by a loudspeaker.

8. The electronic device according to claim 6, wherein the step of generating the DTMF signal further comprises:
   searching for an IP address assigned to the mobile device from an information list of the WLAN;
   finding the MAC address according to the IP address; and
   converting the MAC address to the DTMF signal by using a DTMF generator.

9. The electronic device according to claim 6, wherein the mobile device accesses the WLAN according to a service set identifier SSID.

10. The electronic device according to claim 9, wherein no password is set for the WLAN, while the WLAN is initially set as a no service state.

11. A non-transitory storage medium having stored thereon instructions that, when executed by a processor of an electronic device, causes the processor to perform a method for establishing connection, the electronic device comprising a storage device that stores an access control list, wherein the method comprises:

receiving a request from a mobile device to access a wireless local area network WLAN established by the electronic device;

sending login information to the mobile device, for informing the mobile device to generate dual-tone multi-frequency DTMF signal comprising a media access control MAC address of the mobile device;

receiving the DTMF signal when a distance between the mobile device and the electronic device is less than a predetermined distance;

extracting the MAC address from the DTMF signal; and when the extracted MAC address matches a MAC address recorded in the access control list, modifying a state of the MAC address recorded in the access control list to allow the mobile device to access the Internet through the WLAN.

12. The non-transitory storage medium according to claim 11, wherein the step of receiving the DTMF signal further comprises receiving the DTMF signal by a microphone of the electronic device when the mobile device broadcasts the DTMF signal as sound by a loudspeaker.

13. The non-transitory storage medium according to claim 11, wherein the step of generating the DTMF signal further comprises:

searching for an IP address assigned to the mobile device from an information list of the WLAN;

finding the MAC address according to the IP address; and converting the MAC address to the DTMF signal by using a DTMF generator.

14. The non-transitory storage medium according to claim 11, the mobile device accesses the WLAN according to a service set identifier SSID.

15. The non-transitory storage medium according to claim 14, wherein no password is set for the WLAN, while the WLAN is initially set as a no service state.

\* \* \* \* \*